April 16, 1957 R. EICHENAUER 2,788,795
COMPRESSED AIR FILLING APPARATUS FOR TIRES AND THE LIKE
Filed June 17, 1953 3 Sheets-Sheet 1

INVENTOR
Rudolf Eichenauer
By Schlesinger
Attorney

April 16, 1957 R. EICHENAUER 2,788,795
COMPRESSED AIR FILLING APPARATUS FOR TIRES AND THE LIKE
Filed June 17, 1953 3 Sheets-Sheet 3

INVENTOR
Rudolf Eichenauer
By: Bfshlinger
Attorney

United States Patent Office 2,788,795
Patented Apr. 16, 1957

2,788,795

COMPRESSED AIR FILLING APPARATUS FOR TIRES AND THE LIKE

Rudolf Eichenauer, Frankfurt am Main, Germany

Application June 17, 1953, Serial No. 362,327

15 Claims. (Cl. 137—224.5)

The present invention relates to filling and measuring apparatus for compressed air, and especially to apparatus for measuring the air pressure in automotive vehicle tires and for pumping a tire up if its measured air pressure is low and for relieving its air pressure if the measured pressure is high.

Tire-pumping apparatus is known which comprises a standard pressure gauge, that is fastened on a wall or on a post at an automobile service station, and that is connected by a hose with a conventional tire valve depressor. Furthermore, there is known hand-controlled tire-filling apparatus in which a pressure gauge is built in, and with which by pressure on a lever arm, the tire can be pumped up, or deflated, and the air pressure in the tire can be continuously measured. Moreover, tire-pumping apparatus is known in which the flow of compressed air to the tire is shut off through a prior adjustment by hydraulic means upon attainment of the desired pressure.

All of the mentioned filling apparatus have disadvantages. In the case of those with fixed, exactly indicating, large gauges the attendant must run to and fro between the motor vehicle and the indicating apparatus from time to time in order to control the filling apparatus. In the case of hand apparatus with a built-in gauge, there are naturally limits to the size of the gauge. Furthermore, the sensitive gauge will fluctuate violently; and so the accuracy of the indication is limited. Moreover, the measurement at the motor vehicle cannot itself control the tire pressure. In the case of the known filling apparatus with automatic pressure adjustment, the apparatus itself is costly and does not justify its high price.

One object of the present invention is to provide a tire-filling apparatus which will permit of using a large size, readily-readable gauge for indicating the tire pressure and yet which will permit the attendant to check the pressure and to control it from his place alongside the tire while he is filling the tire.

Another object of the invention is to provide a tire-filling apparatus in which the amount of pressure in the tire can be controlled by the attendant from his position alongside the tire while he is filling the tire.

A further object of the invention is to provide a tire-filling apparatus of the character described in which the air-pressure can be thus remotely controlled by the operator, but which will be relatively simple in construction and relatively inexpensive as compared with automatic pressure-controlling apparatus.

Still another object of the invention is to provide a tire-filling apparatus of the character described in which visual indication will be given automatically to the operator by a light signal when the desired air pressure in the tire has been achieved.

Other objects of the invention will be apparent hereinafter from the specification and from the recital of the appended claims.

In the apparatus of the present invention, a hand controlled filling apparatus is combined with an accurate, large-size gauge, but the hand-filling apparatus is equipped with an electrical switch which operates through remote control an electromagnet that controls the compressed air-inlet valve which is built into the housing for the gauge. The connecting wires between the hand-operated filler and the gauge are carried in the air-hose for the compressed air. Thus compactness and cheapness are achieved.

The gauge may be mounted on the wall of or on a post in the service station. Moreover, a control lamp is provided which is governed by the indication of the gauge. The pressure gauge is equipped for this purpose with an insulated coil spring on which a contact plate is arranged. This spring is connected with the indicator of the gauge and its contact plate is adapted to engage an opposed contact plate that is connected to an insulated adjustable pointer which is adjusted initially to the pressure desired in the tire. When the contact plate on the coil spring engages the contact plate on the adjustable pointer the lamp is illuminated indicating to the attendant that the desired air pressure has been attained in the tire. The lead wires for the contact plate and for the adjustable pointer are carried through the hollow axis of the indicator.

Through the arrangement of electro-mechanical means, an automatic filling operation is achieved, which is broken briefly from time to time after a few seconds, so that the pointer of the gauge, which is provided with a check valve, is advanced stepwise through back pressure from the tire, until it engages the adjustable pointer. For the actuation of the mechanically controlled air supply valve, a switch relay is provided in which a fly wheel contact swings to and fro between two spring-separated contact plates. The fly wheel is swung forwardly upon engagement with the one contact spring through the armature of an electric magnet; and it is swung back through the opposed contact spring. The valve arrangement is so constructed that before opening of the air inlet valve the gauge valve can be closed, and the tire and the gauge can be separately exhausted.

The new apparatus combines thereby all of the advantages of prior apparatus without any of their mentioned disadvantages. There are no limits to the size of the gauge, so that the largest possible size gauge is usable, and the largest possible accuracy is attainable. Through the apparatus of the present invention, also, the sensitivity against outside damage is reduced; and also the production cost is lowered as compared to known apparatus.

Figure 1:
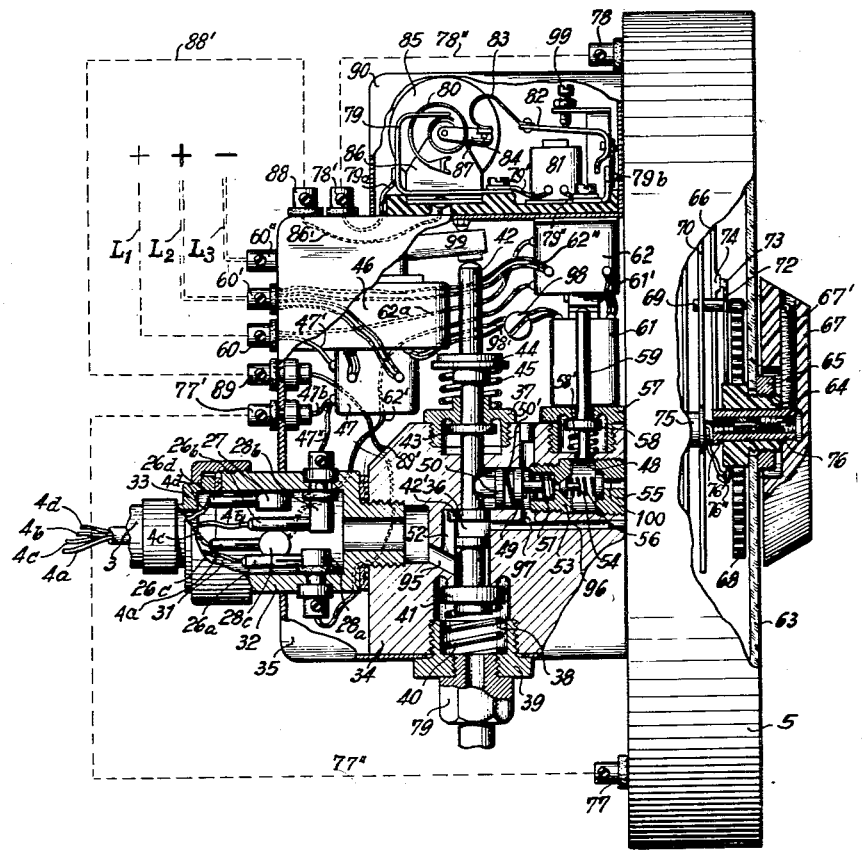
Fig. 1 is a view showing the fixed part of the apparatus, including the gauge, partially in section.

The apparatus comprises a hand grip piece 1 (Fig. 2) provided with a conventional filling nipple 2 that is adapted to be pressed down upon the tire valve of the tire which is to be filled, to open that valve. The hand grip piece 1 is connected through the hose connection 3 and the connecting wires 4a, 4b, 4c, 4d, with a fixed, built-in valve housing 34 (Fig. 1) on which the gauge 5 is secured. The electrical leads extend through the bore of the air hose 3.

The hand-gripping piece 1 has an oblique cylindrical bore 12 at one side into which is threaded the cover 7. This cover has a hole through it through which the stem of a valve 8 extends; and the cover is fitted with a seat for the valve. About the four-sided stem of the valve 8 is positioned a spring 9 which seats at one end against the cover 7 and presses at its other end on the hand lever 10. Hand lever 10 is pivotally connected at one end with the hand-grip piece 1. The valve 8 is provided with a disc 11 which is adapted to seat on cover 7. On the other side of the valve disc 11 the valve stem projects into a bore 12 which communicates with the lengthwise bore 13 through grip-piece 1. The valve disc 11 is pressed by means of the spring 14 onto its seat. This spring surrounds the valve stem and is interposed between the hand piece 1 and the disc 11. The bore 13 opens at one end into the cylinder bore provided for nipple 15, which connects hand grip piece 1 with nipple 2, while on its other end it connects with cylindrical hollow space 16 in piece 1. This cylindrical hollow space 16 can be coupled with the hose connection 17 by a kurled connecting nut 16'.

Through one side of the cylinder wall of the hollow space 16 there extends a contact pin 18c. This pin is mounted in an insulating spool 18d and is secured in position by a nut 19. The spool serves to make air-tight the aperture in the cylinder wall. The contact pin 18c has on the end opposed to the thread for the nut 19 a cylindrical electrical contact head 20c with a transverse bore for holding the contact clamp pin 21c. On the opposed side of the cylinder wall of the hollow space 16 are mounted two insulated electrical contact heads 20a and 20b arranged in the same manner as contact head 20c. The contact head 20b is connected with a manually-operable pressure switch 24; and the contact head 20a is connected with a toggle switch 25. On the cylindrical inner wall of the hollow space 16 there is also fastened an electrical contact block 22 which serves for holding the contact clamp pin 21d. The hand lever 10 has an aperture in which a curved contact spring 23 is fastened, in order that upon downward pressure of the lever 10, the contact spring might come into contact with the nut 19.

The four contact clamping pins 21a, 21b, 21c and 21d are connected electrically through lead wires 4a, 4b, 4c and 4d, respectively, with electrical contact clamping pins 26a, 26b, 26c and 26d (Fig. 1) mounted in the bore of a nipple 32 which threads into gauge support 34. The lead wires are carried through the hose 3 intended for the compressed air and through its binding parts. Pins 26a, 26b, 26c and 26d are mounted, respectively, in electrical contact heads 28a, 28b, 28c and 27 secured in nipple 32. The wiring is such that the contact block 22 of the gripping piece 1 is connected with the ground connection contact block 27, that the toggle switch 25 is connected with the insulated contact head 28a, that the pressure switch 24 is connected with the insulating contact head 28b, and that the hand lever contact head 20c is connected with the insulated contact head 28c. In order to provide room for the necessary extensions for the mounting of the lead wires 4a, 4b, 4c, and 4d hand grip 17 is provided with a sufficiently large hollow space 30 in which the ends of the wires, that connect with contact pins 21a, 21b, 21c, 21d, may be stowed.

The contact heads 28a, 28b and 28c (Fig. 1) are mounted in the cylindrical bore 31 of the cylindrical connecting nipple 32, but are insulated from the nipple. The contact head 27 is mounted without insulation in the bore of the connecting nipple 32. Through a knurled covering nut the hose connection 33 is pressed by means of a packing ring air-tight against the connecting nipple 32. The nipple 32 itself threads into the housing 34.

The housing 34 is fastened at one side to the pressure gauge, which is denoted generally at 5, and is covered by a cap 35. The housing 34 is provided transversely of the threaded connecting nipple 32 with a cylindrical bore 36 which is closed on one side by a valve nipple 37. On its other side the bore 36 communicates with an enlarged cylindrical bore extension 38 which is closed by the threaded nipple 39. Mounted to reciprocate in bore 36 is a valve 41. A spring 40 presses the valve 41 onto the valve seat formed at the juncture of the cylindrical extension 38 and of bore 36. Spring 40 presses the stem of valve 41 into the bore 36.

Mounted in the bore 36 of housing 34 in axial alignment with valve 41 is a valve 42. The stem of valve 42 projects into the bore 36 but between the inner end of the stem of valve 42 and the stem of the valve 41 there is an intervening space. On the stem of valve 42 there is fastened a valve disc 43 which is pressed against its seat in the nipple 37 by a spring 45. This spring is interposed between an outside disc 44, that is secured to valve 42, and the valve nipple 37.

Transversely to the bore 36 there is provided in the housing 34 a stepwisely enlarged cylindrical bore 48. In this bore 48 there is positioned the shut-off valve 49 for the pressure gauge 5. Also mounted in bore 48, and in axial alignment with valve 49, is a valve 50. Between the valve 49 and the valve 50 there is interposed a spring disc 50'. Surrounding the stem of valve 49 and interposed between the head or disc of this valve and a nipple 53, which threads into bore 48, is a coil spring 51. The spring 51 presses the valve 49 toward valve 42. Thereby, through the intermediation of the spring disc 50', which is interposed between valves 49 and 50, the stem of valve 50 is pressed into a recess extending obliquely into one side of the stem of valve 42. The curvature of the recess corresponds to the shape of the end of the stem of valve 49. In this way the stem of valve 42 is held against rotation, and valve 42 is resiliently locked against its seat on nipple 37.

A duct 52 is provided in housing 34 which communicates with bore 36. A lug 42' on the stem of valve 42 engages in this duct to guide valve 42 in its reciprocating movement. The valve nipple 53, as previously stated, is provided on one side with a seat for the valve disc 49. On its other side it is provided with a seat for the valve plug 54 which is pressed on its seat by a spring 56 that thrusts against the valve nipple 55. The valve nipple 55 threads into the gauge 5 and its bore 100 communicates with the Bourdon tube 71 of the gauge.

There is a third bore provided in the housing 34. This bore extends transversely of bore 48 and is for the reception of the valve nipple 57. The valve 58, whose stem 59 extends through the nipple 57, is pressed by a spring 58' onto a seat in the nipple 57.

Figure 2:
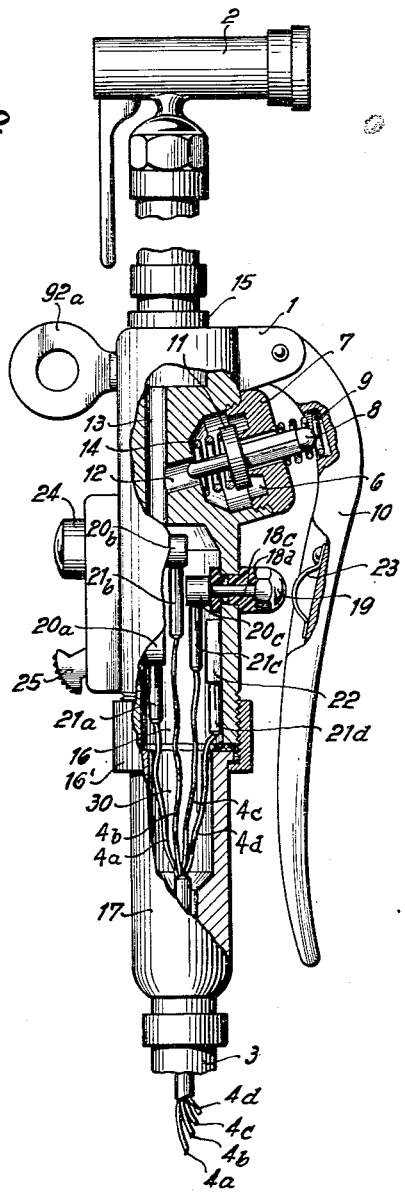
Fig. 2 is a view showing the hand-controlled filling apparatus, partially in section.

Parallel to the valve stem 42 there is mounted within cover 35 an electromagnet 46. The switch relay 47 of this electromagnet is connected on one side with a conducting contact clamp or terminal 60, through line 47' and on its other side it is connected with the snap switch 24 (Fig. 2). Relay 47 is also connected with the gauge 5 electrically. The connection to the snap switch takes place through lead 47'', contact members 28b, 26b, the lead 4b, and contact members 21b, 20b (Fig. 1). Alongside the valve stem 59 there is fastened a magnet 61 whose switch relay 62 is connected on one side by line 62', contact head 28c, contact pin 26c, lead 4c contact pin 21c, and terminal 20c with the contact pin 18c. On the other side relay 62 is connected with the conducting terminal 60 by lines 62''.

Figure 3:
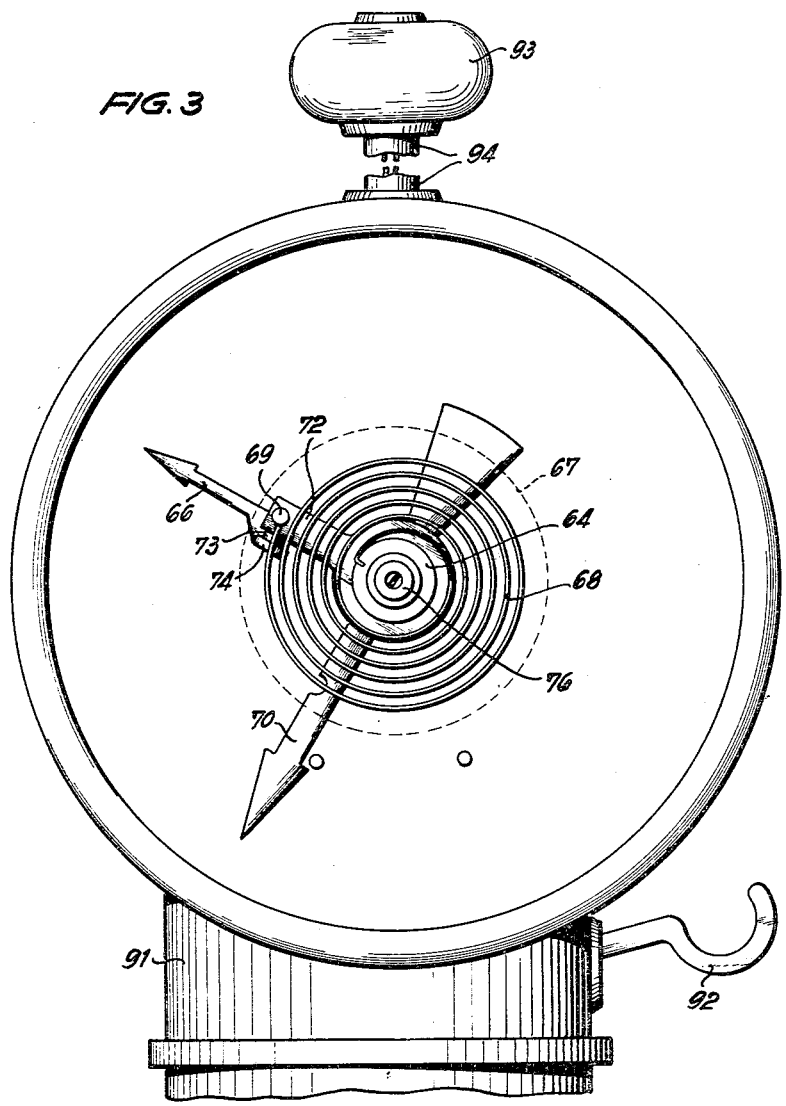
Fig. 3 is a front elevation of the gauge with the turning knob of the adjustable pointer removed.

Through a central bore in the glass disc 63 of the pressure gauge 5 there is positioned a threaded nipple 64 made from an insulating material and fastened in the glass disc by the nut 65. Through the bore of the member 64 there is inserted the hollow axis 76 of the adjustable pointer 66 which is clamped thereto, and which is connected by means of a set screw 67' with the rotary head 67. A spiral spring 68 is mounted about the periphery of the insulated nipple 64 and fastened at one end into this nipple with a hooked portion. At its other end the spiral spring 68 is fastened to a clamping pin 69 made of insulating material which is secured on the arm 72 (Fig. 3). This pin 69 intersects the path of the indicating pointer 70 (Fig. 3) and of the adjustable pointer 66 which lie close to one another. The indicating pointer 70 is connected through a sleeve 75 in known manner with the hollow Bourdon tube of the pressure gauge to be actuated by the pressure of air entering the Bourdon tube through the bore 100 of the threaded nipple 55 (Fig. 1). Adjacent the pin 69 is a contact lug 73 (Figs. 1 and 3) fastened on the arm 72. This lug is adapted to engage with an opposed contact lug 74 fastened on the adjustable pointer 66 when the two pointers register. A flexible insulated lead wire 76' is clamped in the sleeve 76 of the adjustable pointer 66 while a second flexible lead wire 76'' is soldered to the arm 72. Both lead wires are led through the sleeve 75 of the pointer 70 in the inside of the dial 5 and are connected with the insulated terminals 77 and 78 (Fig. 1).

Terminal 77 in gauge 5 is connected to a terminal 77' in cover 35 by a line such as shown in dotted lines at 77''. Likewise terminal 78 in gauge 5 is connected to a terminal 78' in cover 35 by a line such as shown in dotted lines at 78''. The main electrical power lines $L_1$, $L_2$, and $L_3$ are connected to the terminals 60, 60', 60'', respectively, mounted in cover 35. Terminal 60 is connected with relay 62 by line 62a. Terminal 60' is connected with relay 47 by lines 47a, and with relay 62 by lines 62''.

Through the two relays 47 and 62, the wires 98' and the ground-connection screw 98 the current is led to magnet coil 46 or to magnet coil 61 and so sufficient power is achieved to open the valves 42 and 58, respectively. The magnet 46 operates an armature 99 which is pivoted in cover 35 and which engages the upper end of the stem of valve 42. Magnet 61 cooperates with a movable armature 61' which engages the upper end of the valve stem 59. As the valve 42 is depressed by armature 99 on energization of magnet 46, the notch in the stem of the valve 42 presses against the stem of valve 50 so that through the intervening spring disc 50' valve 49 is pressed against its seat. Through this construction, the air lead to the pressure gauge 5 is closed before opening of the main valve 41. Vice versa, the pressure gauge lead is opened after the closing of the main valve 41.

As already described, the relay 47 is connected with the terminal 77 of the gauge. On the other side the terminal 78 is connected with a bent plate 79 arranged in a specially insulated casting 90. A contact spring 80 rolled into spiral form is secured to one end of this bent member. To the other end of the bent member 79 there is connected a lead 79' to the low tension magnet coil 81. The other end of this coil 81 is connected by wire 79'', and plate 79b with the magnet armature 82. This armature, in turn, is connected to a leaf contact spring 83.

Journaled in the housing 90 on bearing blocks 86 is a crank disc 85. Secured to this crank disc is a crank arm 87. When the crank disc 85 oscillates, the contact pin 84 provided on the crank arm 87 moves between the two contacts on the springs 80 and 83. The bearing blocks 86 which carry the crank disc 85 are insulated but are connected by line 86', terminal 88, a line 88', denoted in dotted lines in Fig. 1, terminal 89, and a line 89', with the contact head 28a and through the lead 4a with the toggle switch 25.

In the hollow space of the column 91 (Fig. 3) there is provided a switch not shown which is disconnected by depression of the hooked switch lever 92. The hooked end of this lever is adapted to engage the eye 92a (Fig. 2) of the hand piece 1 to support the hand piece when the pumping apparatus is not in use. Thus, the weight of hand piece 1 will open the switch in the supporting column or post 91.

There is a control lamp 93 provided on a post 94 which is put into circuit by the pressure gauge dial 5. Since the post is sufficiently high the lamp can be seen from all sides.

The operation of the apparatus will now be described.

When it is desired to pump up the tires of an automotive vehicle the pointer 66 is adjusted by rotation of the adjusting head 67 to the desired pressure. The gripping piece 1 is then lifted from the switch lever 92, causing the electrical current to the apparatus to be closed.

Since the two contacts 73 and 74 are in engagement with one another in the at-rest position, the signal lamp 93 (Fig. 3) is supplied with current by the conducting block 72 and the pointer 66, and is lighted as soon as the hand piece 1 is lifted off hook 92. When the tire nipple 2 (Fig. 2) is pressed onto the tire valve then, the pin in the valve nipple presses back the check valve of the tire in known manner so that the air in the tire flows through the hose 3 into the hollow space 31 (Fig. 1) of the nipple 32. From here the air flows through the ducts 95, 52, 36, 96, 97, and 48, forcing open the non-return valve 54, and into the pressure gauge 5 and moves the pointer 70. If the adjustable pointer 66 is higher than the tire pressure then the pointer 70 will not engage and contact the pin 69. If the pointer 66 is lower than the tire pressure the pointer 70 will engage the pointer 66 and carry the contact 73 away from the contact 74, and holds it fast in a position of rest out of engagement with contact 74. In the first case too little air is provided, and the signal lamp 93 remains supplied with current, shining and giving visual notice of the low tire pressure. In the second case there is too much air pressure in the tire; and the signal lamp is extinguished.

In order to lower the air pressure in the tire, the lever 10 is pressed in stepwise. Thereby a circuit is closed through pin 18c (Fig. 2), contact head 20c, contact pin 21c, lead 4c, contact pin 26c (Fig. 1), contact head 28c, and line 62' to relay 62. Thereby, the electromagnet 61 is energized and the escape valve 58 of the pressure gauge is opened against the pressure of spring 58'. This allows escape of air from housing 34 and hose 3. Simultaneously, the valve disc 11 (Fig. 1) is lifted from its seat and the compressed air in the tire can escape along the four-sided stem of valve 8. Because of the decrease in pressure the pointer 70 falls, and with it the pin 69 and the contact 73, until the contact 73 again engages the opposed contact 74. Then the signal lamp 93 is supplied with current again. The lamp is, therefore, illuminated; and the attendant serving the apparatus immediately can stop the supply of air. The pressure in the tire now corresponds exactly to the desired pressure.

In the other case that is, if the tire does not have the desired pressure, the signal light remains illuminated, after nipple 2 is applied to the tire, as an indication that additional compressed air must be supplied to the tire. The attendant now presses the switch head 24 (Fig. 2) so that a weak current impulse is released which brings into action by means of the contact head 20b (Fig. 2), pin 21b, lead 4b, pin 26b (Fig. 1), contact head 28b, lead 47'', and relay 47 the magnet 46. The magnet armature 99 then forces the stem of valve 42 downwardly against the spring 45, first closing the valve 49 and the pressure gauge duct 100 and shortly thereafter opening the main valve 41. The depression of valve 42 moves the valve disc 43 away from its seat on the valve nipple 37 and so air can escape from the bore of the housing 34. Through the opened valve 41, the air pressure flowing from the compressor through the lead 79 can flow through duct 95, nipple 32, and hose 3 into the tire. The pressure flow continues until the switch head 24 (Fig. 1) on the hand-filling apparatus 1 is released in order to test the amount of pressure. The attendant does not need to look to the gauge dial but can glance at the signal lamp to ascertain whether the desired pressure has been exceeded or not. If the desired pressure is exceeded the signal light is extinguished. Then the lever 10 (Fig. 2) is pressed in stepwise until the outflowing air has brought the indicator 70 (Fig. 3) back far enough for the contact between the pointer 66 and the arm 72 to be made and the control lamp again gives a signal light. The previously adjusted height of pressure for the tire is thus attained in the tire.

The size of the rotary head 67 is so chosen that the spiral spring 68 will cover the contact plate 72 and the contact of the pointer 66. After completing the filling process the hand piece 1 is again hung on the hook 92 (Fig. 3) whereby all the electrical apparatus is disconnected.

If a tire is to be filled automatically to a previously selected pressure, the adjustable pointer 66 is adjusted on the pressure gauge to the desired pressure height. After the filling nipple 2 has been pressed onto the tire valve, the toggle switch 25 is actuated. If there is too much pressure in the tire, the air escaping from the tire through hose 3, nipple 32 (Fig. 1), and ducts 96, 97 and 100 into the Bourdon tube of the pressure gauge will cause pointer 70 to move contact 73 (Fig. 3) away from contact 74, and the circuit through the pressure gauge will be interrupted. In the other and the usual case, where the pressure in the tire is less than the desired pressure, the circuit is produced through the gauge and the contact spring 83 so that the main valve 41 is opened by the power of magnet 46, and air is supplied to the tire from pressure line 79.

Simultaneously, however, the magnet 81 will be energized. The circuit to magnet 81 is from switch 25 (Fig. 2) through terminal 20a, pin 21a, lead 4a, pin 26a (Fig. 1), terminal 28a, lead 89', terminal 89, lead 88', terminal 88, lead 86', blocks 86, arm 87, spring 83, armature 82, plate 79b, and lead 79''; and the circuit to magnet 46 is through relay 47 and is through line 79' on the other side of magnet 81, bracket 79, line 79a terminal 78', line 78'', terminal 78, contacts 73 and 74 as long as they are in engagement, terminal 77, line 77'', terminal 77' and line 47b.

The energized magnet causes armature 82 to be drawn downwardly. The spring 83 is caused thereby to press against the contact pin 84 and to force the crank arm 87 and wheel 85 to rotate against the resistance of spring 80. The contact pin 84 is thereby disengaged from the spring 83. However, immediately after that, it is engaged by two claws of the contact plate of the spiral spring 80. Between its release of spring 83 and its engagement of spring 80, the circuit is broken for a brief time, so that the magnet armature 82 and with it the spring 83 again go to their positions of rest.

On the other side of the circuit, the relay 47 in the brief periods, when 84 is in contact with spring 83 or spring 80, supplies the circuit to the magnet 46 so that for rapidly recurring short intervals valve 41 is opened, and compressed air is supplied to the tire. When the valve 41 closes again, each time the circuit is broken, the brief backward thrust of the pressure in the tire goes into the pressure gauge through duct 100 and raises the pointer 70 a step. Since meantime the spiral spring 80 has effected the backward swing of the swinging wheel 85 the operation proceeds automatically until the backwardly raised pointer 70 interrupts the circuit. Thereupon the return valve 54 hinders the emptying of the pressure gauge and so prevents fall of the pointer 70 to the zero position. The stop screw 99 serves for regulating the length of time of the testing and filling strokes. After completion of the automatic filling and testing steps the lever 10 is lightly pressed in so that the pressure gauge is emptied of air because an electrical circuit is made through pin 18c, terminal 20c (Fig. 2), pin 21c, lead 4c, pin 26c, terminal 28c, lead 62', and relay 62, energizing the magnet 61. The indicator 70 thus is brought back to zero position. Preferably the circuit of the relay 62 is connected also with the lever 92 so that with the hanging of the hand grip piece on the hook of lever 92 the pressure gauge is automatically emptied of air.

While the invention has been described in connection with a particular embodiment thereof, it will be understood that it is capable of further modification; and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. Compressed air filling apparatus for pneumatic tires and the like, comprising a hand-grip, a relatively fixed housing, a tire-valve depressor mounted on said hand-grip and adapted to be applied to a tire valve to open the same, a pressure-operated indicator secured to said housing, a hose connecting said hand-grip with said housing, said hand-grip having a duct therein connecting said valve depressor with said hose, a normally-closed valve movably mounted in said housing and adapted to be opened to supply compressed air to said hose, a second normally-closed valve movably mounted in said housing and adapted to be opened by compressed air to supply compressed air from said hose to said indicator, a third normally-closed valve movably mounted in said housing and adapted to be opened to evacuate air from said indicator and from said hose, electrically-operated means mounted in said housing for opening the first and third normally-closed valves, and a pair of manually-operable switches mounted in said hand-grip selectively controlling electrical circuits to the two electrically-operated means.

2. Compressed air filling apparatus for pneumatic tires and the like, comprising a hand-grip, a relatively fixed housing, a tire-valve depressor mounted on said hand-grip and adapted to be applied to a tire-valve to open the same, a flexible air-conducting hose connecting said hand-grip to said housing, said hand-grip having a duct therein connecting said valve depressor to said hose, a valve movably mounted in said housing and adapted to be opened to supply compressed air to said hose, electrically-operated means in said housing for opening said valve, a valve mounted in said hand-grip and adapted to be opened to evacuate air from said duct, manually-operable means movably mounted in said hand-grip for opening the last-named valve, a manually-operable switch mounted on said hand-grip, and electrical wiring extending through said hose from said switch to said electrically-operated means, said switch controlling an electrical circuit through said wiring to said electrically-operated means.

3. Compressed air filling apparatus for pneumatic tires and the like, comprising a hand-grip, a relatively fixed housing, a tire-valve depressor mounted on said hand-grip and adapted to be applied to a tire-valve to open the same, a flexible air-conducting hose connecting said hand-grip to said housing, said hand-grip having a duct therein connecting said valve depressor to said hose, a pressure-operated indicator secured to said housing, a normally-closed valve movably mounted in said housing and adapted to be opened to supply compressed air to said hose, a second normally-closed valve movably mounted in said housing and adapted to be opened by compressed air to supply compressed air from said hose to said indicator, a third normally-closed valve mounted in said housing and adapted to be opened to evacuate air from said indicator and from said hose, electrically-operated means mounted in said housing for opening the first and third normally-closed valves, and a manually-operable switch mounted in said hand-grip controlling an electrical circuit to the electrically-operated means for opening the first-named normally-closed valve, a normally-closed valve mounted in said hand-grip and adapted to be opened to evacuate air from said duct, manually operable means movably mounted in said hand-grip for opening the last-named valve, and means operable on movement of the last-named means to air-evacuating position controlling an electrical circuit to the electrically-operated means for opening the third normally-closed valve.

4. Compressed air filling apparatus for pneumatic tires and the like, comprising a hand-grip, a relatively fixed housing, a tire-valve depressor mounted on said hand-grip and adapted to be applied to a tire-valve to open the same, a flexible air-conducting hose connecting said hand-grip to said housing, said hand-grip having a duct therein connecting said valve depressor to said hose, a pressure-operated indicator secured to said housing, a normally-closed valve movably mounted in said housing and adapted to be opened to supply compressed air to said hose, a second normally-closed valve movably mounted in said housing and adapted to be opened by compressed air to supply compressed air from said hose to said indicator, a third normally-closed valve mounted in said housing and adapted to be opened to evacuate air from said indicator and from said hose, electrically-operated means mounted in said housing for opening the first and third normally-closed valves, and a manually-operable switch mounted in said hand-grip for closing an electrical circuit to the electrically-operated means for opening the first-named normally-closed valve, a normally-closed valve mounted in said hand-grip and adapted to be opened to evacuate air from said duct, manually operable means movably mounted in said hand-grip for opening the last-named valve, and means operable on movement of the last-named means to air-evacuating position to close an electrical circuit to the electrically-operated means for opening the third normally-closed valve, said switches being connected to said first and third normally-closed valves by electrical wiring that extends through said hose from said switches to both said electrically operated means.

5. Compressed air filling apparatus for pneumatic tires and the like, comprising a hand grip, a relatively fixed housing, a tire-valve depressor mounted on said hand grip and adapted to be applied to a tire valve to open the same, a flexible air-conducting hose connecting said hand grip to said housing, said hand-grip having a duct therein connecting said valve depressor to said hose, a gauge mounted on said housing and having a movable indicator, pressure-operated means for moving said indicator, an adjustable pointer movably mounted in said gauge and adapted to be adjusted to the pressure desired in the tire, an electrically-operated signal, means operative when said indicator and said pointer are in register controlling an electrical circuit to said signal to actuate the same, a normally-closed valve mounted in said housing and adapted to be opened by pressure of air in said hose to permit application of pressure of said air to said pressure-operated means, a normally-closed valve mounted in said housing for evacuating air from said pressure-operated means, and means mounted in said hand-grip for remotely controlling the last-named normally-closed valve.

6. Compressed air filling apparatus for pneumatic tires and the like, comprising a hand grip, a relatively fixed housing, a tire-valve depressor mounted on said hand grip and adapted to be applied to a tire valve to open the same, a flexible air-conducting hose connecting said hand grip to said housing, said hand grip having a duct therein connecting said valve depressor to said hose, a normally-closed valve adapted to be opened to supply compressed air to said hose, a pressure gauge mounted on said housing and having a movable indicator, pressure operated means for moving said indicator, a normally-open valve controlling connection of said hose with said pressure-operated means, a movable member connected to said normally-open valve and adapted to be moved in one direction to close the same, said member having a lost-motion connection with said normally-closed valve to open said normally-closed valve on continued movement in said one direction after closing said normally-open valve, spring means for urging said member in the opposite direction, and remote control means mounted on said hand-grip and connected to said member for moving said member in said one direction.

7. Compressed air filling apparatus for pneumatic tires and the like, comprising a hand grip, a relatively fixed housing, a tire-valve depressor mounted on said hand grip and adapted to be applied to a tire valve to open the same, a flexible air-conducting hose connecting said hand grip to said housing, said hand grip having a duct therein connecting said valve depressor to said hose, a normally-closed valve adapted to be opened to supply compressed air to said hose, a pressure gauge mounted on said housing and having a movable indicator, pressure operated means for moving said indicator, a normally-open valve controlling connection of said hose with said pressure-operated means, a movable member connected to said normally-open valve and adapted to be moved in one direction to close the same, said member having a lost-motion connection with said normally-closed valve to open said normally-closed valve on continued movement in said one direction after closing said normally-open valve, spring means for urging said member in the opposite direction, electrically-operated means for moving said member in said one direction, a manually-operable switch mounted on said hand-grip, and wiring disposed in said hose and connecting said switch with said electrically-operated means, said switch being operable to close a circuit through said wiring to said electrically-operated means.

8. Compressed air filling apparatus for pneumatic tires and the like, comprising a hand grip, a relatively fixed housing, a tire-valve depressor mounted on said hand grip and adapted to be applied to a tire valve to open the same, a flexible air-conducting hose connecting said hand grip to said housing, said hand-grip having a duct therein connecting said valve depressor to said hose, a gauge mounted on said housing and having a movable indicator, a spring constantly urging said indicator in one direction, pressure-operated means for moving said indicator in the opposite direction against the resistance of said spring, an adjustable pointer movably mounted in said gauge and adapted to be adjusted to the pressure desired in the hose, and electrically-operated signal, a movable arm, a pair of contacts carried by said arm and said pointer, respectively, and controlling an electrical circuit to said signal to actuate the same, a spring for constantly uring said arm into contact-engaging position, means carried by said indicator for moving said arm away from said pointer to disengage said contacts, and a normally-closed valve mounted in said housing and adapted to be opened by pressure of air in said hose to permit application of pressure of said air to said pressure-operated means.

9. Compressed air filling apparatus for pneumatic tires and the like, comprising a hand grip, a relatively fixed housing, a tire-valve depressor mounted on said hand grip and adapted to be applied to a tire valve to open the same, a flexible air-conducting hose connecting said hand grip to said housing, said hand-grip having a duct therein connecting said valve depressor to said hose, a normally closed valve mounted in said housing and operable when open to connect said hose with a source of compressed air, pressure-operated signal means in said housing adapted to indicate when a desired pressure is attained in the hose, a normally-open valve connecting said hose with said pressure-operated signal means, and remote control means mounted in said hand-grip and connected to said valves to open the first valve and close the second valve.

10. Compressed air filling apparatus for pneumatic tires and the like, comprising a hand grip, a relatively fixed housing, a tire-valve depressor mounted on said hand grip and adapted to be applied to a tire valve to open the same, a flexible air-conducting hose connecting said hand grip to said housing, said hand-grip having a duct therein connecting said valve depressor to said hose, signal means mounted on said housing for indicating the pressure in said hose, pressure operated means connected to said hose for actuating said signal means, a normally-closed valve in said housing adapted when opened to connect said hose to a source of compressed air, remote control means mounted in said hand-grip and operatively connected to said valve to open said valve, and means actuated by said remote control means to close off the connection between said pressure-operated means and said hose when said valve is open.

11. Compressed air filling apparatus for pneumatic tires and the like, comprising a hand grip, a relatively fixed housing, a tire-valve depressor mounted on said hand grip and adapted to be applied to a tire valve to open the same, a flexible air-conducting hose connecting said hand grip to said housing, said hand-grip having a duct therein connecting said valve depressor to said hose, signal means mounted on said housing for indicating the pressure in said hose, pressure operated means connected to said hose for actuating said signal means, a normally-closed valve in said housing adapted when opened to connect said hose to a source of compressed air, and remote control means mounted in said hand-grip and operatively connected to said valve to open said valve, and means actuated by said remote control means to close off the connection between said pressure-operated means and said hose when said valve is open, a second normally-closed valve mounted in said housing and connected to said pressure-operated means, and separate remote control means mounted in said hand-grip and operatively connected to said second valve to open the same to evacuate air from said pressure-operated means.

12. Compressed air filling apparatus for pneumatic tires and the like, comprising a hand-grip, a relatively fixed housing, a tire-valve depressor mounted on said hand grip and adapted to be applied to a tire-valve to open the same, a flexible air-conducting hose connecting said hand-grip to said housing, said hand-grip having a duct therein connecting said valve depressor to said hose, a normally-closed valve mounted in said housing and adapted to be opened to supply compressed air to said hose, electrically-operated means in said housing for opening said valve, a manually-operable electric switch mounted in said hand-grip and electrically connected to said electrically-operated means controlling an electrical circuit to the same, a movable pressure-operated member mounted in said housing and normally connected to said hose to respond by movement to the pressure in said hose and having means operable when a predetermined pressure is attained in the hose to break said electrical circuit, and means for shutting off the connection between said pressure-operated member and said hose when said valve is open.

13. Compressed air filling apparatus for pneumatic tires and the like, comprising a hand-grip, a relatively fixed housing, a tire-valve depressor mounted on said hand grip and adapted to be applied to a tire-valve to open the same, a flexible air-conducting hose connecting said hand-grip to said housing, said hand-grip having a duct therein connecting said valve depressor to said hose, a normally-closed valve mounted in said housing and adapted to be opened to supply compressed air to said hose, electrically-operated means in said housing for opening said valve, a movable pressure operated member mounted in said housing and normally connected to said hose to respond by movement to the pressure in said hose, an electrically-actuated switch in said housing for intermittently making and breaking the circuit to said electrically-operated means, means in said housing for shutting off the connection between said pressure-operated member and said hose when said valve is open, and a manually-operable electric switch in said hand-grip and electrically connected to said electrically-actuated switch to institute operation of the same.

14. Compressed air filling apparatus for pneumatic tires and the like, comprising a hand-grip, a relatively fixed housing, a tire-valve depressor mounted on said hand grip and adapted to be applied to a tire-valve to open the same, a flexible air-conducting hose connecting said hand-grip to said housing, said hand-grip having a duct therein connecting said valve depressor to said hose, a normally-closed valve mounted in said housing and adapted to be opened to supply compressed air to said hose, electrically-operated means in said housing for opening said valve, a movable pressure operated member mounted in said housing and normally connected to said hose to respond by movement to the pressure in said hose, an electrically-actuated switch in said housing for intermittently making and breaking the circuit to said electrically-operated means, means in said housing for shutting off the connection between said pressure-operated member and said hose when said valve is open, and a manually-operable electric switch in said hand-grip and electrically connected to said electrically-actuated switch to institute operation of the same, and a separate electric switch mounted in said hand-grip and electrically connected to said electrically-operated means to institute operation of the same independently of said electrically-actuated switch.

15. Compressed air filling apparatus for pneumatic tires and the like, comprising a hand-grip, a relatively fixed housing, a tire-valve depressor mounted on said hand grip and adapted to be applied to a tire-valve to open the same, a flexible air-conducting hose connecting said hand-grip to said housing, said hand-grip having a duct therein connecting said valve depressor to said hose, a normally-closed valve mounted in said housing and adapted to be opened to supply compressed air to said hose, electrically-operated means in said housing for opening said valve, a signal, a manually-operable electric switch mounted in said hand-grip and electrically connected to said electrically-operated means controlling an electric circuit to the same, a movable pressure-operated member mounted in said housing and normally connected to said hose to respond by movement to the pressure in said hose and having means operable when a predetermined pressure is attained in the hose to break said electrical circuit and to actuate said signal, and means for shutting off the connection between said pressure-operated member and said hose when said valve is open.

References Cited in the file of this patent

UNITED STATES PATENTS

| | | |
|---|---|---|
| 1,779,670 | Griffin | Oct. 28, 1930 |
| 1,866,653 | Jauch | July 12, 1932 |
| 2,010,062 | Dawson | Aug. 6, 1935 |
| 2,118,852 | McDonnell | May 31, 1938 |
| 2,568,086 | Nolde | Sept. 18, 1951 |